United States Patent
Ferino et al.

(10) Patent No.: US 8,990,116 B2
(45) Date of Patent: Mar. 24, 2015

(54) PREVENTING EXECUTION OF TAMPERED APPLICATION CODE IN A COMPUTER SYSTEM

(75) Inventors: Fabrice Ferino, San Francisco, CA (US); James Blaisdell, Novato, CA (US)

(73) Assignee: Mocana Corporation, San Francisco, CA (US)

( * ) Notice: Subject to any disclaimer, the term of this patent is extended or adjusted under 35 U.S.C. 154(b) by 822 days.

(21) Appl. No.: 12/246,609

(22) Filed: Oct. 7, 2008

(65) Prior Publication Data

US 2010/0088769 A1 Apr. 8, 2010

(51) Int. Cl.
G06F 21/00 (2013.01)
G06F 21/57 (2013.01)
G06F 21/10 (2013.01)

(52) U.S. Cl.
CPC .............. *G06F 21/577* (2013.01); *G06F 21/10* (2013.01); *G06F 2221/033* (2013.01)
USPC .............................................. 705/50; 726/26

(58) Field of Classification Search
USPC .............................................. 705/50; 726/26
See application file for complete search history.

(56) References Cited

U.S. PATENT DOCUMENTS

| 2005/0289543 A1* | 12/2005 | Taivalsaari et al. ............... 718/1 |
| 2006/0095895 A1* | 5/2006 | K. ................................... 717/130 |
| 2006/0190934 A1* | 8/2006 | Kielstra et al. ................. 717/148 |
| 2007/0107057 A1* | 5/2007 | Chander et al. ................. 726/22 |
| 2007/0136811 A1* | 6/2007 | Gruzman et al. ............... 726/24 |
| 2008/0016339 A1* | 1/2008 | Shukla .......................... 713/164 |
| 2008/0147612 A1* | 6/2008 | Gryaznov ......................... 707/3 |

OTHER PUBLICATIONS

PaX; From Wikipedia; Jul. 16, 2009; http://en.wikipedia.org/wik/PaX. 2pgs.
NX bit; From Wikipedia; Jul. 16, 2009; http://en.wikipedia.org/siki/NX_bit. 2pgs.

* cited by examiner

*Primary Examiner* — John Hayes
*Assistant Examiner* — John M Winter
(74) *Attorney, Agent, or Firm* — Beyer Law Group LLP (57) ABSTRACT

Methods and systems for preventing an application which has been maliciously or inadvertently tampered with from causing harm to a computer system are described. Application code of the tampered application is inputted into a code analyzer. The code is analyzed and functions within the application code are identified and examined. A profile is created and may be a description of how a function is intended to operate, that is, the function's expected behavior. Calls between functions are examined and a called function is replaced with a replacement function, such that a call to an original function results in a call to the replacement function. The original function is unaware that it is not getting function calls or that such calls are being directed to a replacement function or stub. A replacement function contains code to ensure that the user space maintains its original appearance.

6 Claims, 6 Drawing Sheets

PREVENTING EXECUTION OF TAMPERED APPLICATION CODE IN A COMPUTER SYSTEM

BACKGROUND OF THE INVENTION

1. Field of the Invention

The present invention relates to computers and computer network security. More specifically, it relates to secure application execution in a computer's user space.

2. Description of the Related Art

Protection of applications that execute in the user space of a computing device has become increasingly important. As computers become more connected with networks and other computing devices, they are more vulnerable to attacks from external entities. In particular, application programs executing in the user space are especially susceptible to tampering, and as a result may not perform their intended functions. They may be altered to download malware, confidential data, spread viruses, and the like. There are errors in the execution of application programs in the user space that may be taken advantage of by external entities.

Presently, there are security programs that are able to analyze application code to detect errors in the code that may lead to vulnerabilities that hackers can take advantage of, such as Coverity and Fortify. There are other products that try to prevent these types of errors from executing at runtime, such as StackGuard, PaX, and NX bit. All these products focus on detecting and preventing a specific type of error that may lead to vulnerabilities which hackers may use to create a problem in the application code, such as stack overflow. Because such security programs may not always be effective and new vulnerabilities may always arise, we can assume that hackers will be able to take advantage of code vulnerabilities and create problems. Therefore, it would be desirable to prevent the problem itself (e.g., execution of arbitrary code) from happening in cases where hackers were able to take advantage of vulnerabilities and to create the possibility that problems may occur when the application executes.

SUMMARY OF THE INVENTION

One embodiment of the present invention is a method of preventing an application which has been maliciously or inadvertently tampered with from causing harm to a computer system. Application code of the tampered application is inputted into a code analyzer. The code is analyzed and functions within the application code are identified and examined. Multiple profiles are created and each identified function is assigned a profile. A profile may be a description of how a function is intended to operate, that is, the function's expected behavior. Multiple replacement functions are created using a first set of functions, where each function is called by the identified functions and a second set of functions where each function in the second set calls the identified function. In one embodiment, calls between functions are examined and a called function is replaced with a replacement function, such that a call to an original function results in a call to the replacement function. In this embodiment, the original function is unaware that it is not getting function calls or that such calls are being directed to a replacement function or stub. A replacement function contains code to ensure that the user space maintains its original appearance. In another embodiment, a linker utility program is invoked to replace called functions with multiple replacement functions.

One embodiment of the present invention is a computer system having a user space containing a supervisor module containing a supervisor stack, stack management software, and profile retrieval software. The system also contains multiple replacement functions used for replacing one or more original functions in the user space. In another embodiment the computer system also contains a supervisor component in the kernel space, thereby securing it from manipulation. In another embodiment, the computer system also contains a special linker utility program to replace called functions with replacement functions.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Example embodiments of an application security process and system according to the present invention are described. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

Methods and systems for preventing applications from performing in harmful or unpredictable ways, and thereby causing damage to computing device are described in the various figures. During execution, applications may be modified by external entities or hackers to execute in ways that are harmful to the computing device. Such applications, typically user applications, can be modified, for example, to download malware, obtain and transmit confidential information, install key loggers, and perform various other undesirable or malicious functions. In short, application programs are vulnerable to being modified to execute in ways that they were not intended for. Thus, a discrepancy may arise between the intended behavior of an application or function and the actual behavior of the application or function. Although there are products to prevent tampering with applications and functions by unauthorized parties, these products may not always be effective. Moreover, such products cannot prevent authorized parties from maliciously tampering with applications and functions on a computing device. The figures below describe methods and systems for preventing applications and functions that have been modified from executing and potentially doing damage to the host computing device.

Figure 1:
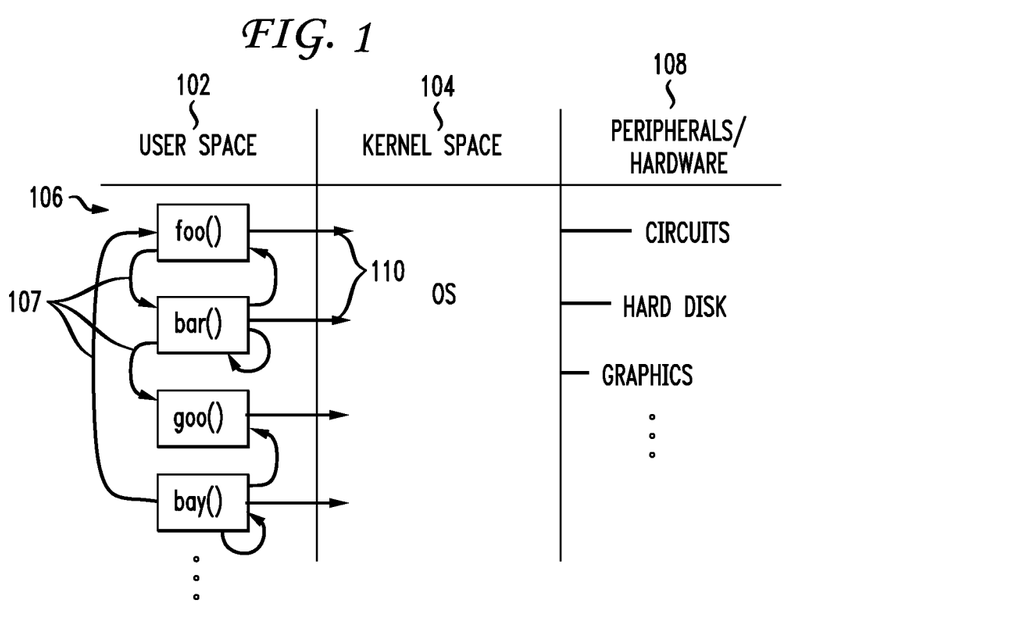
FIG. 1 is a logical block diagram of a computing device memory space showing relevant sections of memory in accordance with one embodiment.

FIG. 1 is a logical block diagram of a memory space computing device. A modern computing device (hereinafter referred to as "computer") using a modern operating system typically has storage area that may be divided into two areas: a user space 102 (where most of the applications and programs execute) and a kernel space 104 (or simply, kernel). An application or program (not shown) is essentially a series of calls to one or more functions 106. A function may be described as a logical set of computer instructions intended to carry out a particular operation, such as adding, writing, connecting to a circuit, and so on. Example functions foo( ), bar( ), goo( ), and baz( ) are shown in user space 102. When it is executed, a function always belongs to an application and does not exist independently of applications. As is known in the art, libraries become part of applications during the linking process, described below.

When an application executes, in most cases, a given function within the application may call other functions that are also within the same application. These calls are represented by arrows 107 in FIG. 1. Additionally, a function may also make, what is referred to, as a system call to kernel space 104. As is known in the art, devices and hardware 108 are typically accessed via kernel 104, which contains the operating system for the computer. In modern operating systems, kernel space 104, a secured area and strongly protected from external entities. Kernel 104 uses specific features of the CPU (e.g., Memory Management Unit, Supervisor Mode, etc.) to protect the kernel's own functions and data from being tampered with by code in user space 102. However, it should be noted that some computers may not have a separate kernel space 104, for example, lightweight computing devices or handheld devices. A function in user space 102 may make system calls, represented by arrows 110 to kernel 104 when an application needs a service or data from kernel 104, including a service or utilization of a hardware component or peripheral.

As noted earlier, applications in user space 102 may be modified to do unintentional or harmful operations. When an application is first loaded onto the computer (or at any time thereafter) when the owner or administrator is confident that the application has not been tampered with, the application will execute in its intended and beneficial manner on the computer. That is, the application will do what it is supposed to do and not harm the computer. When an application has been tampered with, the tampering typically involves changing the series of function calls or system calls made within the application. A change in a single function call or system call may cause serious harm to the computer or create vulnerabilities. In one embodiment of the present invention, the intended execution of an application or, in other words, the list of functions related to the application, is mapped or described in what is referred to as a profile.

Figure 2:
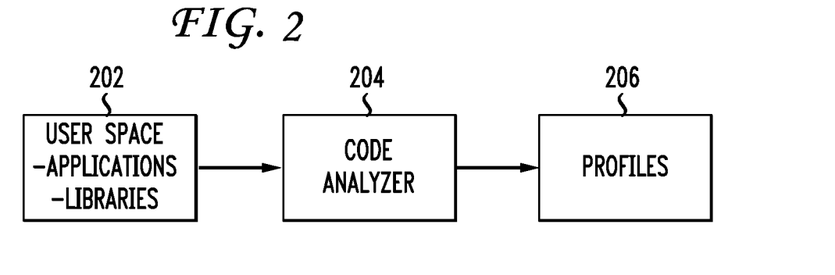
FIG. 2 is a logical block diagram of a process of creating profiles for applications in accordance with one embodiment of the present invention.

FIG. 2 is a logical block diagram of a process for creating profiles for applications in accordance with one embodiment of the present invention. Block 202 represents application code and libraries in user space 102. In one embodiment, block 202 represents all code in all the applications. In other embodiments, it may represent a portion of the code in some of the applications, but not necessarily all the applications. Similarly, in one embodiment, all the libraries (there may only be one) are analyzed and in other embodiments, only some of the libraries are included.

Block 204 represents a code analyzer of the present invention. Code analyzer 204 accepts as input application and library code contained in block 202. In one embodiment, code analyzer 204 examines the application and library code 202 and creates profiles represented by block 206. Operations of code analyzer 204 are described further in the flow diagram of FIG. 6. Briefly, code analyzer 204 creates a profile for each or some of the functions. Thus, functions foo( ), bar( ), goo( ), and so on, may each have one profile. A profile is a description of how a function is intended to operate; that is, how it should normally behave using sets of functions that the function may call and which functions may call it. In one embodiment, a profile is generated for each function. This process is described in greater detail below. As is known in the art, a function always operates in the context of a single application. That is, calls made to other functions by a function in one application do not change; the function will always make the same calls to other functions. Code analyzer 204 need only be run once or periodically, for example, when new applications or programs are added or deleted. Creating and storing profiles 206 may be seen as prerequisite steps for subsequent processes described below.

Figure 3:
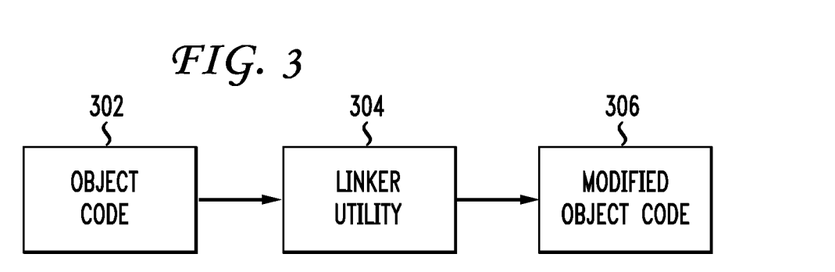
FIG. 3 is a logical block diagram of data and programs for creating modified object code using a linker utility in accordance with one embodiment of the present invention.

FIG. 3 is a logical block diagram of data and programs for creating modified object code using a linker utility in accordance with one embodiment of the present invention. As noted above, applications are comprised of functions which execute and may invoke or call other functions. Block 302 represents original object code of all or some of the applications after the applications (i.e., source code) have been compiled using conventional methods, namely, a suitable compiler depending on the source code language. Object code 302 (which may be object code for one, a subset, or all of the applications) is run through a linker utility program 304. Linker utility 304 examines each call made from one function to another and, in one embodiment, replaces the function being called with a replacement or substitute function, which may be referred to as a stub (indicated by the prefix x). This may be done for each function that is called at least once by another function. For example, if foo( ) calls bar( ), it will now call xbar( ).

As is known in the field, object code is typically run through a linker to obtain executable code. Block 306 represents "modified" object code which is the output of linker utility program 304. It is modified in the sense that functions that are being called are being replaced with a stub. In a normal scenario, a conventional linker program would have linked the object code to create normal executable code to implement the applications. However, in the present invention, linker utility 304 replaces certain functions with stubs and, therefore, creates modified object code. It is modified in that every function that calls bar( ), for example, now calls xbar( ). In one embodiment, functions that call bar( ), but are now calling xbar( ) in the modified object code, are not aware that they are now calling xbar( ). Furthermore, the original bar( ) is not aware that it is not getting calls from other functions from which it would normally get calls; that is, it does not know that it has been replaced by xbar( ). In one embodiment, the object file (containing the modified object code) also contains a "symbol table" that indicates which part of the modified object code corresponds to each function (similar to an index or a directory). Linker utility 304 adds new code (new CPU instructions), the stub (replacement function), and makes the "symbol table" entry for the function making a call point to the stub instead. In this manner, functions which want to call bar( ) will be calling xbar( ) instead. Xbar( ) has taken the identity of bar( ) in the "eyes" of all callers to bar( ). In one embodiment, the stub xbar( ) is a call to a supervisor which includes a supervisor stack and additional code to ensure that the environment does not look altered or changed in anyway.

Figure 4A:
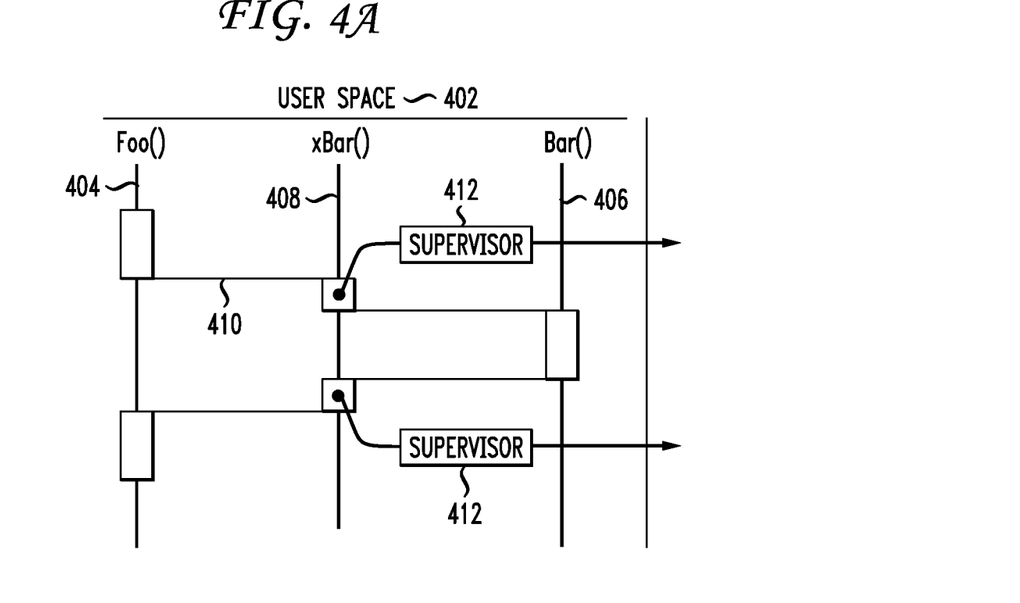
FIG. 4A is a sequence diagram showing one embodiment of a stub implementation in accordance with one embodiment.

FIG. 4A is sequence diagram showing one embodiment of a stub implementation in accordance with one embodiment. A user space 402 has three time lines. A timeline 404 for foo( ) shows operation of the foo( ) function. A bar( ) timeline 406 shows operation of the bar( ) function. Inserted between foo( ) timeline 404 and bar( ) timeline 406 is an xbar( ) timeline 408 showing operation of the xbar( ) function. During operation of foo( ), a call is made to bar( ) shown by line 410. In one embodiment, the call is intercepted by xbar( ) time line 408. Xbar( ) invokes a supervisor 412, residing in user space 402. Supervisor 412 may make a system call if necessary.

Figure 5:
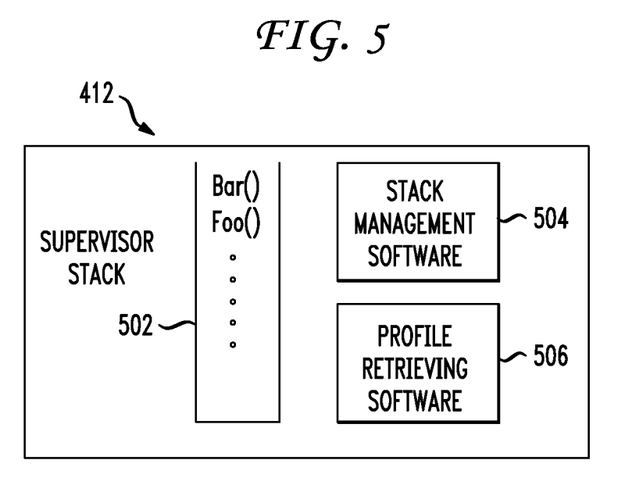
FIG. 5 shows one embodiment of the supervisor as including a supervisor stack and stack management software in accordance with one embodiment.

FIG. 5 shows one embodiment of supervisor 412 as including a supervisor stack 502 and stack management software 504. As part of management software 504, there may be software 506 for retrieving profiles. In one embodiment, profiles are stored with the application file itself. This may be preferred because the application file is generally a read-only file. Thus, the code and the profile are secure and cannot be edited, and the profile is also available automatically when the application file is read, so that the application can execute. In another embodiment, the profile is stored in a separate, read-only file. Referring again to FIG. 4, operations performed by supervisor 412 are described in greater detail in the flow diagrams below. Xbar( ) timeline 408 calls bar( ) timeline 406. Bar( ) executes and when it has completed, it returns the results to xbar( ). Bar( ) is unaware that it was called by xbar( ) and not by foo( ). Supervisor 412 is invoked again and examines the stack to ensure that foo( ) 404 called bar( ). Supervisor stack 502 may be used to check which functions are being called and which functions are making these calls. Xbar( ) time line 408 may then return the result to foo( ) time line 404.

Figure 4B:
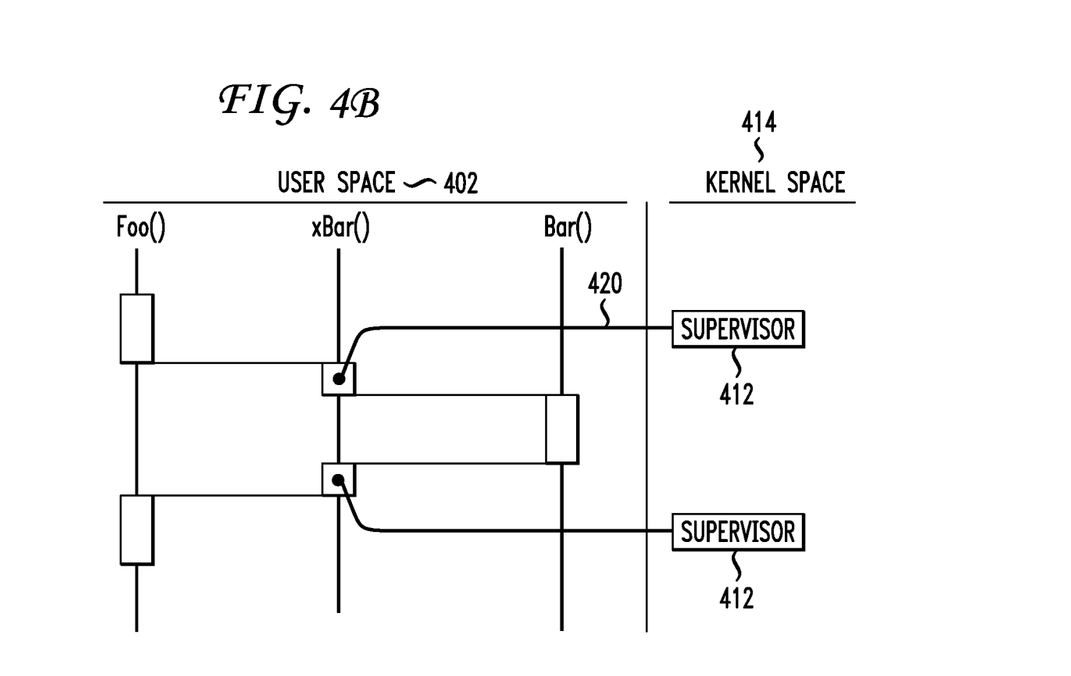
FIG. 4B is a sequence diagram similar to the one shown in FIG. 4A but showing a more secure implementation of the supervisor.

FIG. 4B is a sequence diagram similar to the one shown in FIG. 4A but shows a more secure implementation of supervisor 412. In this implementation, supervisor 412 resides in kernel space 414. By keeping supervisor 412 in user space 402 in FIG. 4A, stack 502 may be vulnerable to manipulation. By storing supervisor 412 in kernel space 414, xbar( ) or any stub must make a system call to push or pop functions, onto or out of supervisor stack 502. As noted, system calls are the only way for user space applications to communicate with the kernel. This system call may be an entirely new one if the target operating system supports adding new system calls. By keeping the stack in kernel space 414, it may not be modified without making a system call. As described below, the new system call, represented by line 420, to supervisor 412 may be verified by checking its origin. For example, the call should not be originating from the original function code, such as code in function bar( ), but rather from code that is only in xbar( ). For example, the return address of the system call 420 performed by xbar( ) may be stored in a register (not shown) or in a stack, depending on the system call binary interface utilized by the target operating system. This return address may also be checked to ensure that it is located in a read-only code section of the application.

Figure 6:
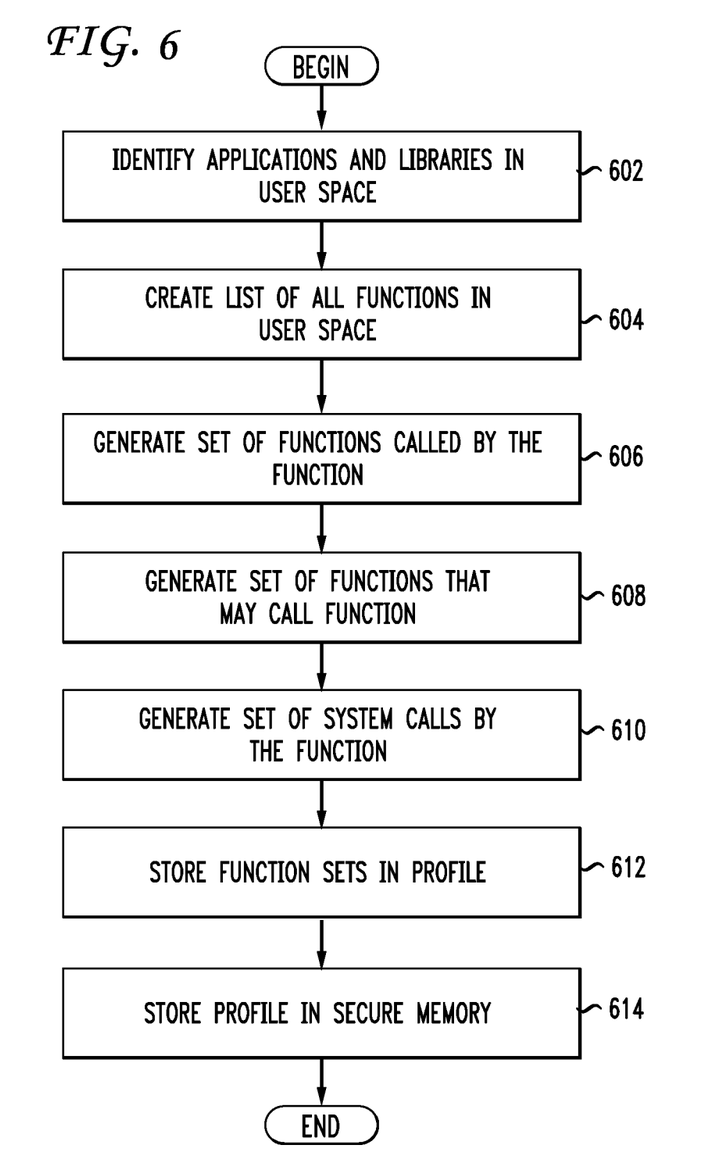
FIG. 6 is a flow diagram of a process of generating a profile for a function in accordance with one embodiment.

FIG. 6 is a flow diagram of a process of generating a profile for a function in an application in accordance with one embodiment. This process was described briefly in FIG. 2. A profile consists of sets or lists of functions and system calls. The "expected behavior" of a function is defined in a profile using these sets and lists. In one embodiment, this process of creating profiles for functions in an application is performed for a particular application prior to operation of the linker utility program and of other processes described below, none of which is operable without profiles for each or some of the functions. In one embodiment, the profile generation process may be performed by a service provider offering services to an entity (e.g., a company or enterprise) wanting to utilize the security measures described in the various embodiments. At step 602 applications and libraries are identified. The applications may include all the end-user applications and libraries needed to execute them. In one embodiment, at step 604, a list of all the functions in the user space is created. For each function, referred to as primary function herein, code analyzer is applied to the primary function to generate a list or set of functions that are called by the primary function. This may be done by the code analyzer analyzing the code of the primary function.

At step 608 the code analyzer generates the set of functions that may call the primary function. In one embodiment this is done by the code analyzer examining code in all the other functions (a complete set of these other functions was determined in step 602). At step 610 the code analyzer generates a set of system calls made by the primary function. As with step 606, the code analyzer examines the code in the primary function to determine which system calls are made. As described, a system call is a call to a function or program in the kernel space. For example, most calls to the operating system are system calls since they must go through the kernel space.

At step 612 the function sets generated at steps 606, 608, and 610 are stored in a profile that corresponds to the primary function. The function sets may be arranged or configured in a number of ways. One example of a format of a profile is shown below. At step 614 the profile is stored in a secure memory by the profiler program, such as in ROM, or any other read-only memory in the computing device that may not be manipulated by external parties. This process is repeated for all or some of the functions in the user space on the computing device. Once all the profiles have been created, the process is complete.

Figure 7:
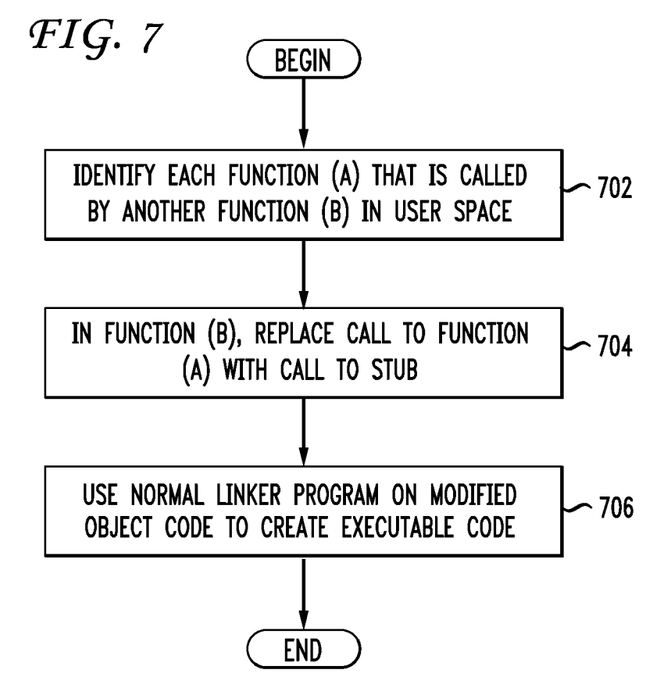
FIG. 7 is a flow diagram of a process of creating executable code from modified object code containing stubs in accordance with one embodiment.

FIG. 7 is a flow diagram of a process of creating executable code from modified object code containing stubs in accordance with one embodiment. Before the security features of the present invention are implemented during normal execution of applications in the user space of the computing device, the executable code of each function that makes a call to another function is modified so that the call is made instead to a stub created by linker utility 304. At step 702 each function that is called by another function in the user space is identified. In a simple example, if foo( ) calls bar( ), and goo( ) calls foo( ), functions bar( ) and foo( ) are identified. The called functions are referred to as functions (A) and the calling functions (foo( ) and goo( )) as functions (B). At step 704 calls to functions (A) in functions (B) are replaced with calls to stubs corresponding to functions (A). Following the same example (and as described extensively above), if foo( ) originally calls bar( ), it now calls xbar( ) and goo( ) now calls xfoo( ). The functions foo( ) and bar( ) are unaffected and none of the functions are aware of the calls made to the stubs. In one embodiment, the substitution of the regular function call with the new call to the stub is made in the object code of functions (B) by linker utility program 304. At step 706 a conventional linker program is run on the modified object code to create the executable code, which now incorporates calls to the stubs. In one embodiment, this process is done for each application program in the user space, whereby all the relevant functions are modified. Once this process is complete, the process of creating executable code for the modified object code for each application is complete.

Figure 8:
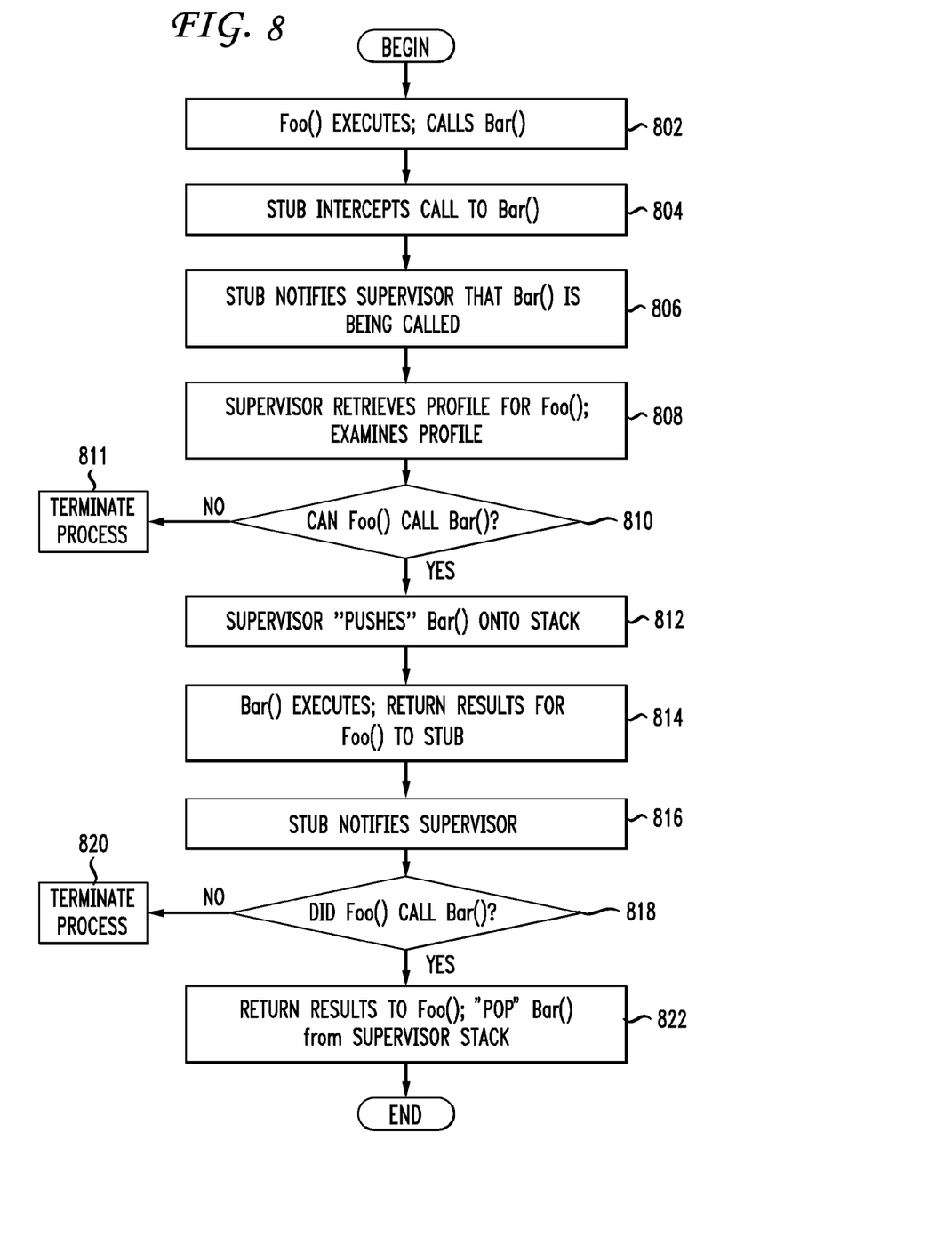
FIG. 8 is a flow diagram of a supervisor process executing to implement the security features of the present invention in accordance with one embodiment.

FIG. 8 is a flow diagram of a supervisor process for implementing the security features of the present invention in accordance with one embodiment. The processes described in FIGS. 6 and 7 are essentially prerequisite steps for implementing the process of FIG. 8. At step 802, an application is executing normally and a particular function, foo( ), executes. During execution of foo( ), another function, bar( ), is called by foo( ). At step 804, stub xbar( ) code that has been inserted as a substitute for bar( ) intercepts the call to bar( ). The function bar( ) (as well as other functions) has a unique identifier associated with it that is generated by code analyzer 204 for each function analyzer 204 profiles as described in FIG. 2. The stub contains this unique identifier. This identifier (part of the code) distinguishes the stub for bar( ) from other stubs.

At step 806 the stub xbar( ) notifies the supervisor that bar( ) is being called by foo( ). In one embodiment, the supervisor, including the supervisor stack and associated software, resides in the user space. In another embodiment, the supervisor resides in the kernel, in which case a system call is required by the stub. At step 808 the supervisor retrieves the profile for the calling function, foo( ), from secure memory, such as ROM. It then examines the profile and specifically checks for functions that may be called by foo( ). The profile may be stored in any suitable manner, such as a flat file, a database file, and the like. At step 810 the supervisor determines whether foo( ) is able or allowed to call bar( ) by examining the profile. If bar( ) is one of the functions that foo( ) calls at some point in its operation (as indicated accurately in the profile for foo( )), control goes to step 812. If not, the supervisor may terminate the operation of foo( ), thereby terminating the application at step 811. Essentially, if bar( ) is not a function that foo( ) calls, as indicated in the profile for foo( ) (see FIG. 6 above), and foo( ) is now calling bar( ), something has been tampered with and suspect activity may be occurring.

At step 812 the supervisor pushes bar( ) onto the supervisor stack, which already contains foo( ). Thus, the stack now has bar( ) on top of foo( ). The stub is not placed on the supervisor stack; it is essentially not tracked by the system. At step 814 bar( ) executes in a normal manner and returns results, if any, originally intended for foo( ) to the stub, xbar( ). Upon execution of bar( ), the supervisor retrieves its profile. Calls made by bar( ) are checked against its profile by the supervisor to ensure that bar( ) is operating as expected. For example, if bar( ) makes a system call to write some data to the kernel, the supervisor will first check the profile to make sure that bar( ) is allowed to make such a system call. Functions called by bar( ) are placed on the supervisor stack.

Once the stub receives the results from bar( ) for foo( ), the stub notifies the supervisor at step 816 that it has received data from bar( ). At step 818 the supervisor does another check to ensure that foo( ) called bar( ) and that, essentially, foo( ) is expecting results from bar( ). It can do this by checking the stack, which will contain bar( ) above foo( ). If the supervisor determines that foo( ) never called bar( ), the fact that bar( ) has results for foo( ) raises concern and the process may be terminated at step 820. If it is determined that foo( ) did call bar( ), control goes to step 822 where the stub returns the results to foo( ) and the process is complete. The fact that xbar( ) is returning the results is not known to foo( ) and, generally, will not affect foo( )'s operation (as long as the results from bar( ) are legitimate). The function bar( ) is then popped from the supervisor stack. In one embodiment, bar( ) is popped from the stack, its results are sent to foo( ) (by xbar( )). If foo( ) keeps executing, it may remain in the stack, and the above process repeats for other functions called by foo( ).

Below is a sample format of a profile written in the C programming language.

Sample Profile Format

```
#define MOC_ID_CalledByFunc1ViaStatic (2)
#define MOC_ID_CalledByFunc2ViaNonStatic (3)
#define MOC_ID_CanBeStatic (4)
#define MOC_ID_Func1 (5)
#define MOC_ID_Func2 (6)
#ifndef __XXXXXX_FUNCIDS_ONLY__
extern const unsigned __MOC_calls_CanBeStatic[ ];
extern const unsigned __MOC_calls_Func1[ ];
extern const unsigned __MOC_calls_Func2[ ];
const unsigned const* const __XXXXXXX_db[14]
#ifdef __GNUC__
__attribute__ ((section(".nfp_db"),used))
#endif
= {
(const void*) 0, (const void*) 5, /* version, number of functions */
(const void*) 0xFFFFFFFF, (const void*) 0, /* no signal callback,
reserved */
0, 0, /* 2 CalledByFunc1ViaStatic */
0, 0, /* 3 CalledByFunc2ViaNonStatic */
__MOC_calls_CanBeStatic, 0, /* 4 CanBeStatic */
__MOC_calls_Func1, 0, /* 5 Func1 */
__MOC_calls_Func2, 0, /* 6 Func2 */
};
const unsigned __MOC_calls_CanBeStatic[ ]
#ifdef __GNUC__
__attribute__ ((section(".nfp_db"),used))
#endif
= {
   1,    /* size */
   MOC_ID_CalledByFunc2ViaNonStatic,
};
const unsigned __MOC_calls_Func1[ ]
#ifdef __GNUC__
__attribute__ ((section(".nfp_db"),used))
#endif
= {
   1,    /* size */
   MOC_ID_CalledByFunc1ViaStatic,
};
const unsigned __MOC_calls_Func2[ ]
#ifdef __GNUC__
__attribute__ ((section(".nfp_db"),used))
#endif
= {
   1,    /* size */
   MOC_ID_CanBeStatic,
};
#endif
/* end of generated file */
```

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method of preventing a tampered application from causing harm to a computer system, the method comprising:
    analyzing compiled source code by examining a plurality of functions in the source code, said analyzing executed by a processor wherein compiled source code is obtained using a suitable compiler depending on source code language;
    for a specific function from the plurality of functions, utilizing a code analyzer to identify a set of calling functions and a set of called functions wherein each called function is considered a verified called function and each calling function is considered a verified calling function said utilizing executed by the processor;
    generating a profile for the specific function, said profile indicating correct behavior of the specific function and including the set of calling functions and the set of called functions;
    further comprising running object code of the application through a linker utility program to replace the function being called with the stub;
    executing the compiled source code wherein when the specific function executes and calls a first function which is verified as a legitimate called function by examining the profile of the specific function a first stub function executes instead of the first function; and
    preventing the tampered application from allowing malware to be installed on the computer system or from allowing malicious functions to execute on the computer system.

2. A method as recited in claim 1 further comprising examining calls between functions and replacing a verified called function with a stub, said examining executed by said processor.

3. A method as recited in claim 2 further comprising calling the stub when making a call to an original function, said calling executed by said processor.

4. A method as recited in claim 3 further comprising ensuring that a verified called function is unaware that it is not getting function calls, said ensuring executed by said processor.

5. A method as recited in claim 2 further comprising including code in the stub to ensure that a user space maintains its original appearance.

6. A method as recited in claim 1 further comprising inputting a library into a code analyzer, said inputting performed by said processor.

* * * * *